Dec. 4, 1962  F. LITZKA  3,066,394
APPARATUS FOR THE MANUFACTURE OF DEEPLY-WEBBED GIRDERS
Filed Jan. 30, 1959  4 Sheets-Sheet 3
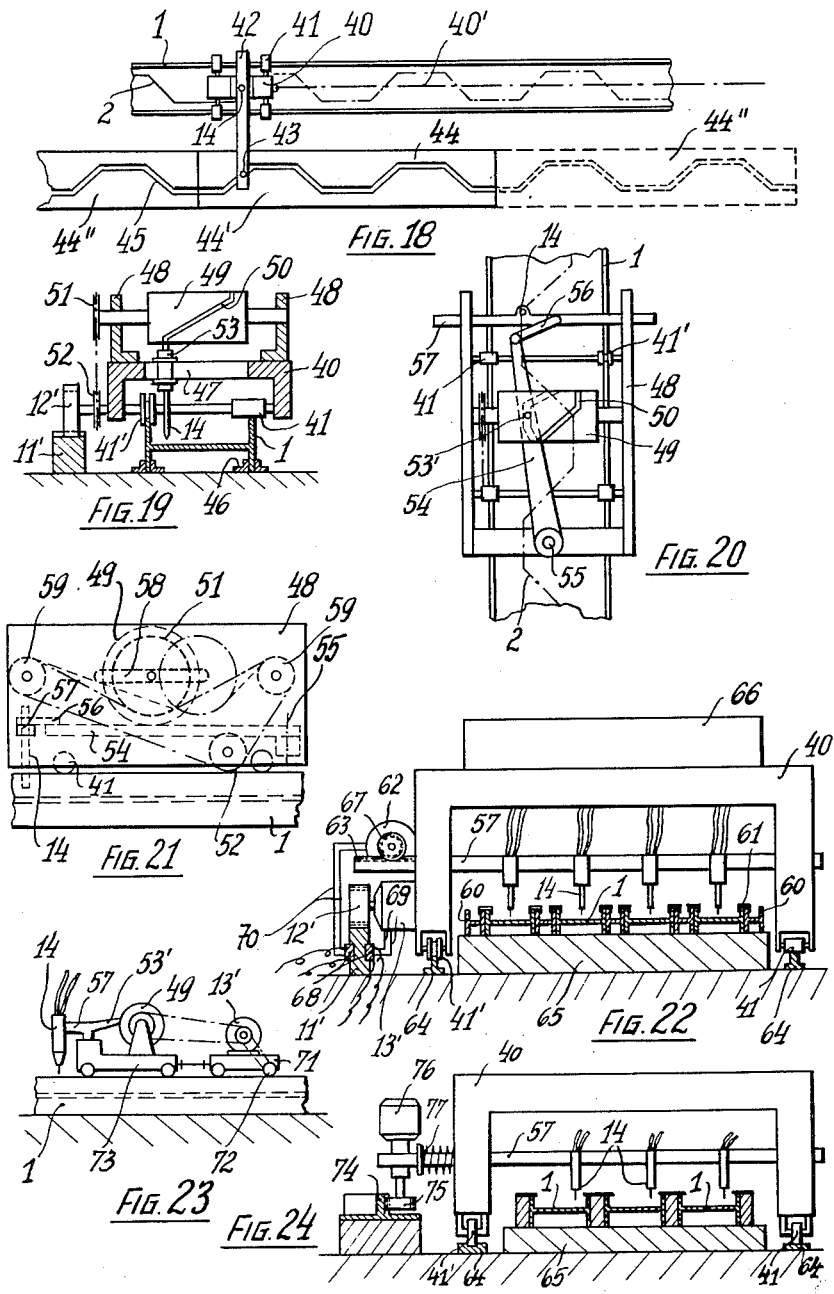
INVENTOR.
FRANZ LITZKA
BY
Mestern & Rollin
ATTORNEYS Dec. 4, 1962 F. LITZKA 3,066,394
APPARATUS FOR THE MANUFACTURE OF DEEPLY-WEBBED GIRDERS
Filed Jan. 30, 1959 4 Sheets-Sheet 4
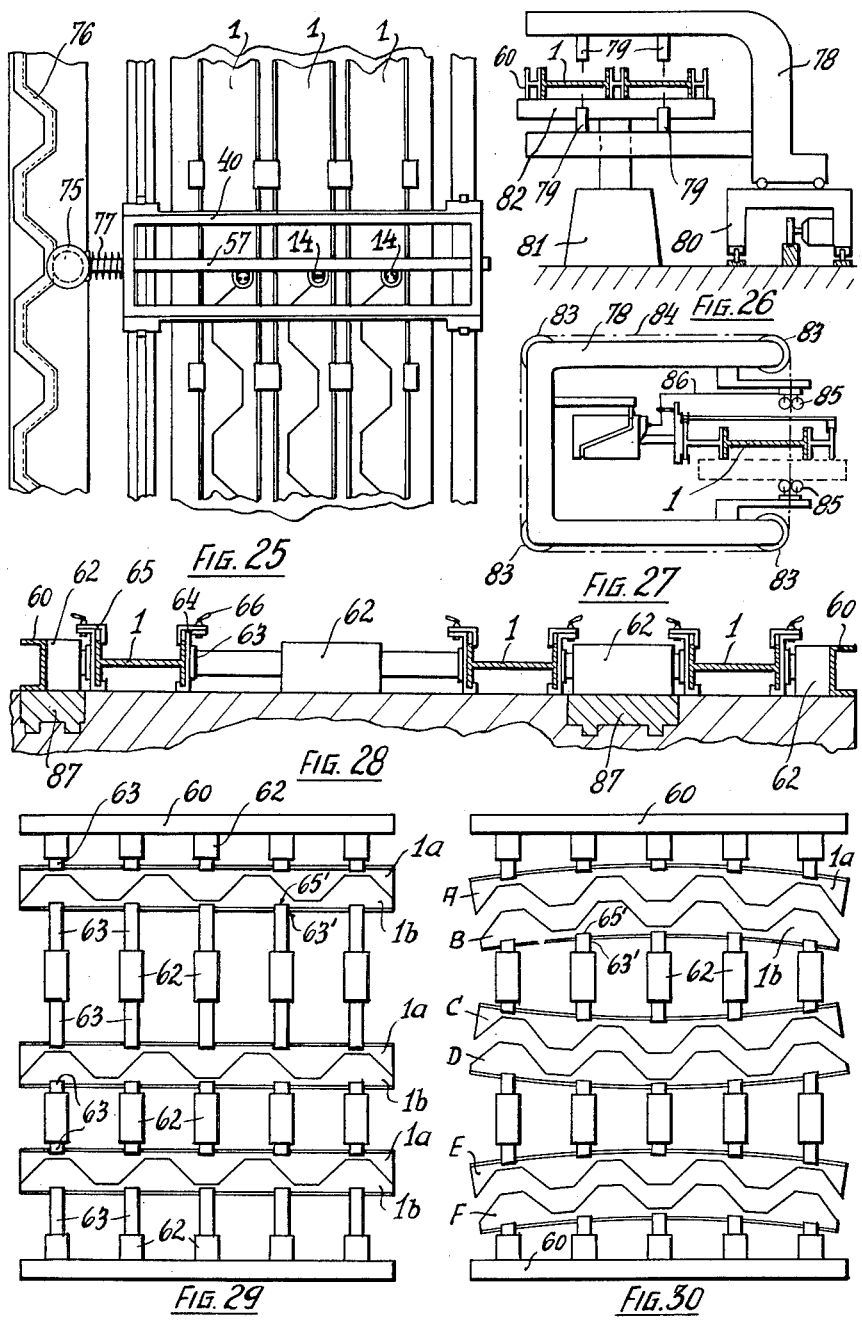
INVENTOR.
FRANZ LITZKA
BY
Mestern & Rollin
ATTORNEYS United States Patent Office 3,066,394
Patented Dec. 4, 1962

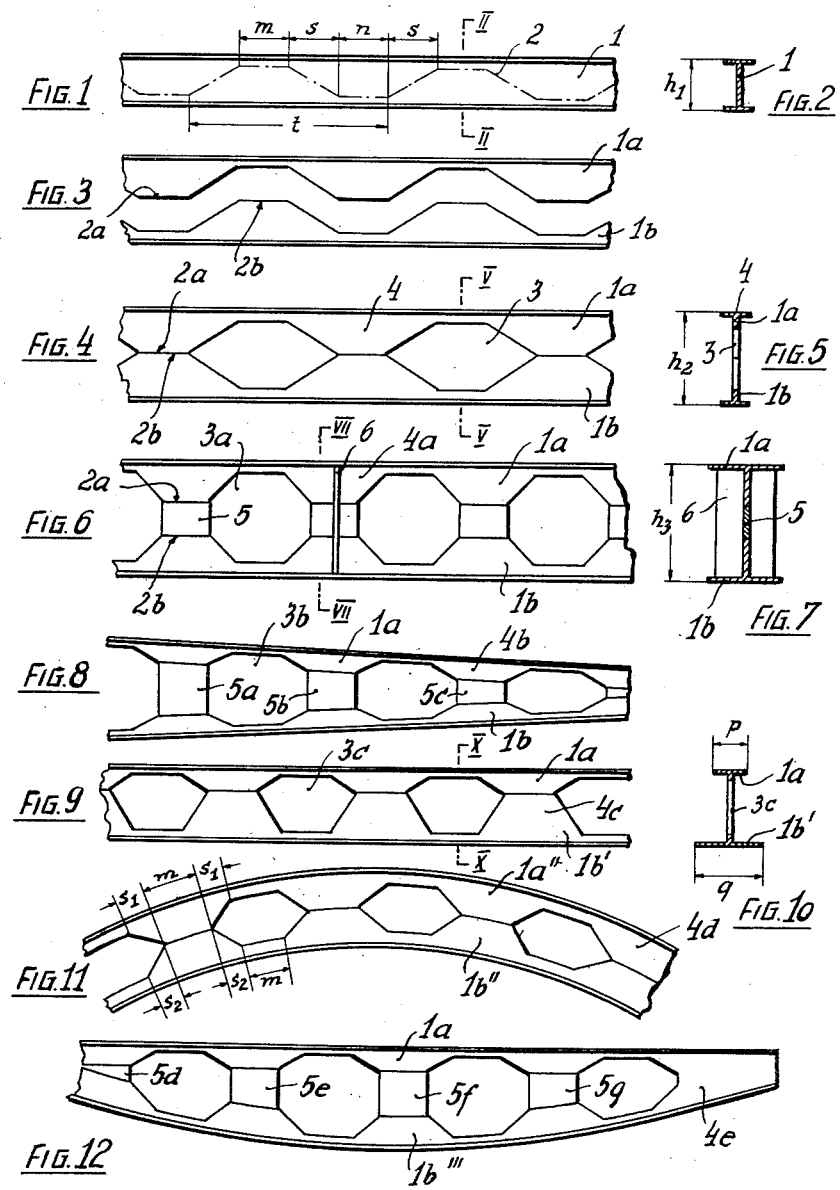

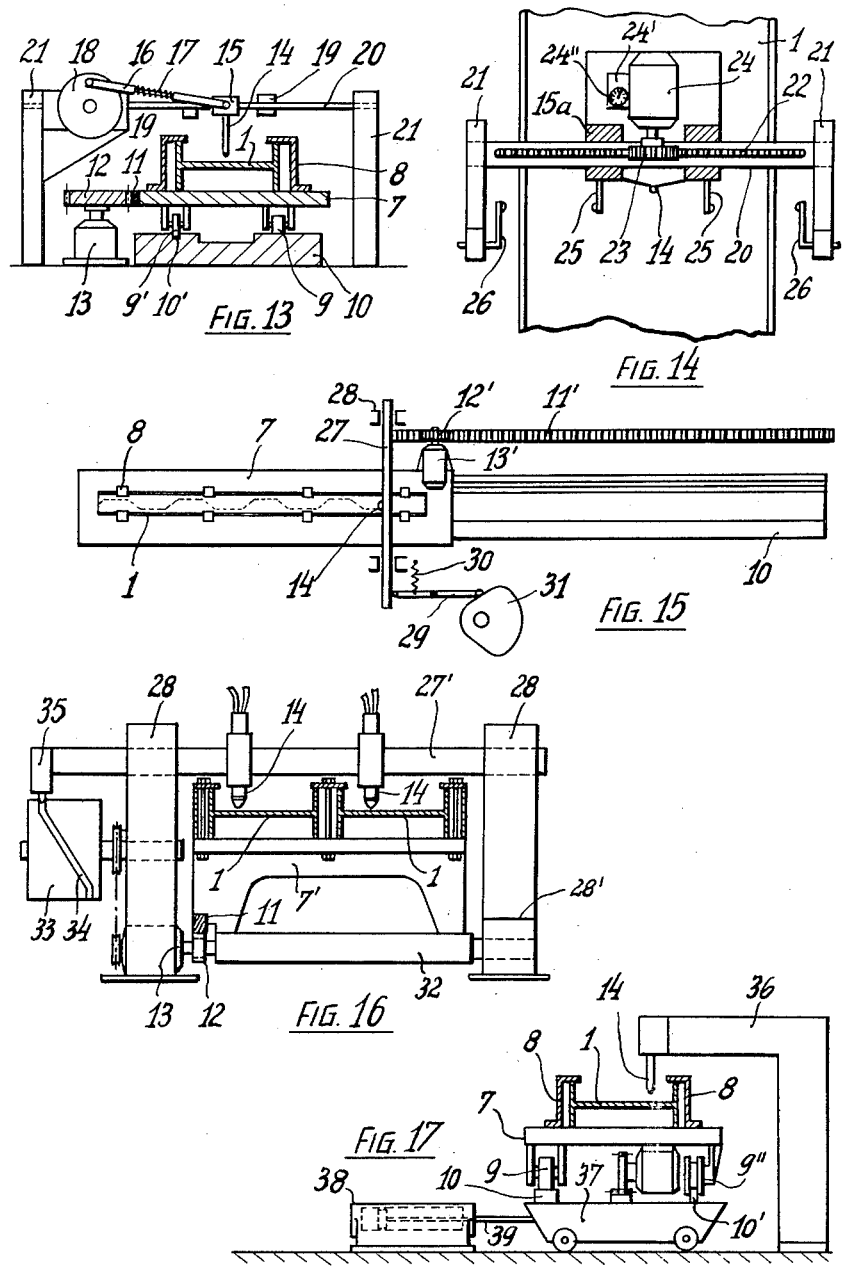

3,066,394
APPARATUS FOR THE MANUFACTURE OF DEEPLY-WEBBED GIRDERS
Franz Litzka, Haus No. 3, Marktredwitz, Germany
Filed Jan. 30, 1959, Ser. No. 790,173
Claims priority, application Germany Feb. 5, 1958
3 Claims. (Cl. 29—200)

The present invention relates to apparatus for producing deeply-webbed honeycomb girders of increased loading capacity from solid I-beams of a lower loading capacity. The principal object of the invention is to provide improved means for carrying out a process in which the web of an I-beam is severed along a line corresponding to a repetitive angularly undulating pattern by suitable means such as, for example, a cutting torch, with relative movement between the I-beam and the severing device, whereupon the separated beam portions are moved apart by the dimension of the total depth of undulation and one beam portion is offset longitudinally by half a period of the pattern to cause the projecting web portions or teeth of both beam sections to abut one another, whereupon the two offset beam portions are welded together at their contacting edges.

By thus severing and offsetting the I-beam sections a higher loading capacity is attainable without any increase of weight. The resulting economy in material in relation to rolled I-beams of the same loading capacity in most cases balances the production costs due to the welding of the beam sections in accordance with the invention, thus causing these welded beams often to be preferred to rolled girders ready for delivery.

In some instances it may be desirable to insert (e.g. by welding) between the projections of the severed and offset web portions a set of spacers, especially sheet-metal sections, to form honeycomb girders of increased depth of web. It is thus possible to form honeycomb girders which are to have a varying depth of web over the whole length thereof in that spacers of different height, corresponding to the differences in the depth of web, are inserted between the web sections. By this means it is possible for numerous different girder shapes which cannot be produced at all by the rolling and drawing method.

Furthermore it is possible to interchange sections severed from two different I-beams where severance patterns have different repetition periods, but equally long contact edgs and to bend these sections along a curved line, for example, along to the line of moments of the completed girder in the built-in state, whereupon the upper portion of one I-beam is connected with the lower portion of the other I-beam (e.g. welded) to form an arcuate honeycomb girder. This step however is suitable also in such cases in which there is to be attained a pre-arching of I-beams intended to bridge considerable spans. While this shaping in the case of solid web girders can be produced not at all or only with great difficulty, the bending in the case of honeycomb girder sections involves no effort whatsoever.

A feature of a suitable apparatus adapted for carrying out the aforedescribed method and embodying the invention consists in the provision of holding means, for example, auxiliary girders, by which each flange of an I-beam may be connected in such a manner that, after the beam has been severed, the two sections thereof are held by the holder means and adapted to be displaced together therewith for the purpose of longitudinally offsetting these sections. When several adjoining I-beams are to be severed in one operation it is possible for an auxiliary girder having two coupling flanges to be provided between each pair of I-beams as a holder therefor.

In accordance with a more particular feature of the invention there may be provided clamping members adapted to be varied in length, especially fixedly mounted cylinders adapted to be actuated by hydraulic or pneumatic means where suitably flanged cylinders respectively grip flanges of the I-beams to be severed. It is, however, also possible for mechanical arrangements such as spindles, for example, to be used as clamping members.

Several clamping members, especially cylinders adapted to be operated by hydraulic or pneumatic means, may be distributed over the length of the I-beam to be severed, whereby each cylinder piston may be actuated with a different length of stroke for producing curved girder sections. By individual control of the single cylinders it is possible to produce girders of manifold shape. Furthermore it is an advantage for the cylinders to be provided between pair of parallel I-beams, each cylinder then having two pistons acting in opposite directions to one another.

The invention will be described further, by way of example, with reference to the accompanying drawings, in which:

FIG. 1 is a side elevation of a I-beam prior to its bi-section;
FIG. 2 a cross section through the beam of FIG. 1;
FIG. 3 a side elevation of the bisected I-beam of FIG. 1 with the beam sections drawn apart at right angles to the longitudinal axis;
FIG. 4 a side elevation of a new honeycomb girder formed after the lateral displacement of one beam section and after welding:
FIG. 5 a cross section taken on the line V—V of FIG. 4;
FIGS. 6 to 12 are side elevations showing different alternatives of the honeycomb girder of FIG. 4;
FIG. 13 is a diagrammatic section through a severing device of an apparatus in which the I-beam is displaced in longitudinal direction and the severing device in the transverse direction;
FIGS. 14 to 16 are sections showing some modifications of the device according to FIG. 13;
FIG. 17 is a diagrammatic cross section through a severing device of an apparatus in which the I-beam is displaced longitudinally and transversely and the severing device is fixedly disposed;
FIG. 18 is a diagrammatic plan view of a severing device which is moved along a stationary I-beam;
FIG. 19 is a section of a modification of the system of FIG. 18;
FIG. 20 is a diagrammatic plan view of the severing device of FIG. 19;
FIG. 21 is a diagrammatic side elevation of the severing device of FIG. 20;
FIG. 22 is a diagrammatic front elevation of a severing device of an apparatus in which several I-beams are adjacently disposed and bisected jointly;
FIG. 23 is a side elevation of a severing device drawn by a carriage;
FIG. 24 is a front elevation of a modification of the system of FIG. 22;
FIG. 25 is a plan view of the device of FIG. 24;
FIG. 26 is a front elevation of a double-armed severing device;
FIG. 27 is a front elevation of a modification of the system of FIG. 26;
FIG. 28 is a cross section through several I-beams having clamping devices; and
FIGS. 29 and 30 are plan views of straight and curved girders respectively.

The I-beam 1 shown in FIG. 1 is the starting girder, which in accordance with the aforementioned method is to be severed and after severance to be offset, thus creating from the original I-beam according to FIG. 2 a honeycomb girder in accordance with the example of FIGS. 4 and 5. The I-beam 1 is bisected by means of a severing device, which consists of a cutting torch or a mechanically operated chip-removing device, along the line 2, thus creating two girder sections 1a and 1b in accordance with FIG. 3. The line 2 follows a repetitive undulating pattern and corresponds somewhat to the profile of a rack, with the edge portions $m$ and $n$ disposed parallel to one another and parallel to the flanges of the I-beam 1. When the line 2 is symmetrical, then the edge portions $m$ and $n$ are of the same length and also the upwardly and downwardly sloping portions $s$ of line 2 have identical lengths. The period or pitch $t$ is hence composed of the sections $m+n+2s$. In individual cases it may also be desirable to choose the line 2 to be non-symmetrical. In this case, however, care must be taken that the girder sections after offsetting fit together again. In the case of a non-periodical dividing line 2 it is necessary therefore mainly to fit together sections of different I-beams. In accordance with FIG. 3, the girder sections 1a and 1b are moved apart transversely to the longitudinal axis of the girder viz. to such an extent that the projecting edge portions 2a and 2b of the girder sections 1a and 1b, when the latter are relatively displaced parallel to the longitudinal direction of the girder, do not come into contact with one another.

In accordance with the example of FIG. 4 one girder section 1b has been moved in this direction through half the length of a period of the undulating pattern, i.e. half the pitch $t$; thus causing the projecting edge portions 2a and 2b to abut one another so that they may be welded together; between the welds at the edges 2a, 2b there are formed free spaces 3 having a honeycomb shape. The honeycomb girder 4 in accordance with FIG. 4 has a substantially greater depth $h_2$ than the I-beam 1 of FIG. 2, amounting to practically double the depth $h_1$ of the original beam. It is evident from the example of FIG. 4 that it is irrelevant what shape the sections $s$ in accordance with FIG. 1 have, as these sections $s$ merely outline the honeycomb cut-outs 3. Therefore it is not necessary for them to be straight lines, but also arcuate sinusoidal shapes may be selected. Owing to the greater depth $h_2$ of the web the honeycomb girder 4 has a greater loading capacity than the original I-beam 1 in accordance with FIG. 2, a substantial advantage resides in the fact that the weight of the honeycomb girder 4 is the same as that of the I-beam 1.

If for certain special reasons it is desired to have a web of still greater depth $h_3$, then it is possible to insert web plate sections 5 as spacers between the girder sections 1a and 1b in accordance with FIGS. 6 and 7 and to weld them together with the girder sections 1a and 1b in the region of the edges 2a, 2b. The increased buckling risk of the honeycomb girder 4a connected therewith in certain circumstances can be eliminated immediately if between the flanges of the honeycomb girder 4a the stiffening members 6 are inserted and welded thereto. If the I-beam is of aluminum, the stiffening members 6 should be either riveted to the web of the honeycomb girder 4a or welded only along lines parallel to the longitudinal axis of the girder. Transverse welds, however, should be avoided in the case of aluminum girders.

FIG. 8 shows that by correspondingly shaping the web spacers 5a, 5b, 5c it is possible to form a honeycomb girder 4b which is variable with regard to the depth of its web. The dimensions of the web spacers 5a to 5c may be established in advance theoretically and it involves no difficult work to cut the correct shape of the sheet-metal blanks 5 on suitable converting machines. The girder sections 1a and 1b may then be produced in exactly the same manner as described with regard to FIGS 1 to 4.

It is frequently desired, in addition, to have honeycomb girders differing in the width $p$ and $q$ of their flanges in accordance with FIG. 10. In this case it is desirable to divide two I-beams 1 of which one has the flange width $p$ and the other the flange width $q$. Then the upper section of one beam is welded to the lower section of the other beam. Besides, the depth of web of one girder section 1b' (FIG. 9) may be varied to differ to any extent from the depth of web of the other girder section 1a. The bisection of an I-beam 1 in accordance with the examples of FIGS. 1 to 3 results in the further advantage that the individual girder sections 1a'' and 1b'' in accordance with the example of FIG. 11 may be formed with a slight bend or curvature. In the example of FIG. 11 two different I-beams 1 in accordance with FIG. 2 are used which differ from one another in that the pitch $t$ is of different magnitude. As the outer girder section 1a'' during the bending operation is compressed at its contact edges whereas the inner girder section 1b'' is correspondingly stretched, it is necessary to allow for a change in the pitch $t$ of both sections 1a'' and 1b'' by a proper dimensioning of edge portions $s_1$ and $s_2$. The edge portions $m$ on the other hand are initially equally long, as the girder sections 1a'' and 1b'' are welded together at these portions. The smaller the curvature of the honeycomb girder 4d in accordance with the FIG. 11, the less are the differences between the sloping edge portions $s_1$ and $s_2$. If the girder 4d should have only a slight camber then it is not necessary to provide different patterns as the pitch difference, owing to the large radius of curvature, will then be negligible. Therefore it is possible in this case for the sections 1a'' and 1b'' of the same I-beam 1 to be shaped and welded together.

In the example of FIG. 12 a curved girder section 1b''' is joined to a straight girder section 1a, while between the two girder sections 1a and 1b''' sheet-metal blanks 5d to 5g are inserted as spacers. The honeycomb girder 4e obtained in this manner hence has a shape which conforms to the line of moments expected under load.

It is evident from the alternatives shown in FIGS. 6 to 12 that by means of starting I-beams of different size and by interposition of sheet-metal spacers 5 and also by changing the shape of the girder sections 1a, 1b, there may be formed numerous types of honeycomb girders not limited to those specifically shown in the drawings. For example, it is possible in accordance with the example of FIG. 12 to connect two curved girder sections 1b''' with one another, so as to obtain by interposition of corresponding sheet-metal blanks 5 a barrel-shaped honeycomb-girder construction.

FIGS. 13 to 16 show some examples regarding the drive and control of the beam 1 and the separating device 14; in these instances the beam 1 is moved in its longitudinal direction and the severing device 14, which in these examples is a cutting torch, carries out a transverse movement relative to the movement of the beam 1.

In the example of FIG. 13 the I-beam 1 is clamped on a table top 7 by means of the clamping members 8. The table 7 supports the rack engaged by the pinion 12 driven by the stationary motor 13; pinion 12 imparts a longitudinal movement to the table 7 which by means of the wheels 9 and 9' is rendered mobile in the form of a carriage. The wheel 9' of the carriage travelling in the track 10' acts at the same time as a guide wheel for the table carriage 7. On a fixed frame 21 on the stationary cross bar 20 there is a slide 15 adapted to be moved to and fro by way of the connecting rod 16 and the crank 18. The slide 15 has the severing device 14 mounted thereon. The connecting rod 16 is variable in length by means of the spring elements 17 so that when the slide 15 strikes the adjustable stops 19 the rod 16 is resiliently compressed during the remaining stroke of the crank 18. Thus, while the I-beam 1 is moved longitudinally, the slide 15 with the severing device is moved at the same time by the crank 18 in the transverse direction, thus causing the cutter 14 to cut the oblique blanks $s$ of FIG. 1. When the slide 15 strikes against the stops 19 then the straight sections $m$ and $n$ extending parallel to the flanges are cut in accordance with FIG. 1. The length of stroke of the crank disc 18 must therefore be greater than the actual desired length of travel of the cutter 14. By adjusting the stops 19 the depth of tooth of the line 2 in accordance with FIG. 1 is varied so that I-beams of different depth of web may be severed by means of the same apparatus. One revolution of the crank disc 18, in dependence upon the advance speed of the I-beam, predetermines a certain length $t$ of stroke. Within this constant length of stroke it is thus possible for any deformation of the line 2 to be carried out by the stops 19. If on the other hand the length of stroke $t$ is to be altered in other beams or girders then it is advisable to incorporate between the feed motor 13 and the crank disc 18 stepped transmission or a stepless gearing, by means of which, in dependence upon the feed speed of the table 7, the speed of the crank 18 may be varied. Owing to the motion of the crank drive 18 the sections $s$ of the curve 2 of FIG. 1 will have the shape of sine curve. As mentioned already at the beginning, these lines $s$ have no functional effect on the assembly of the honeycomb girder 4 according to FIG. 4.

A modified arrangement illustrated in FIG. 14 resides in the fact that the slide 15a has the motor 24 mounted thereon, the pinion 23 of which is in rolling engagement with a rack 22 which at the same time acts as a guide key of the bar 20 for guiding the slide 15a. It is also possible to replace the bar 20 by means of an independent rack, and one may also arrange two guide bars 20 for guiding the slide 15a. The toothed pinion 23 moreover may also be replaced by a driving arrangement having friction wheels. On the slide 15a there are provided electric contacts 25 which cooperate with stationary but adjustable opposite contacts 26 and act, for example, on a reversing switch 24'. When the slide has been moved to such an extent that the contacts 25 and 26 touch one another, then the reversing switch 24' of the electric motor 24 is actuated, thus causing a reversal of the direction of rotation and consequently of the motion of the slide 15a. At the other end the same control operation is subsequently repeated. The reversing switch 24' is provided with a delayed-action control, for example, an adjustable clock work 24'', so that the period of standstill of the electric motor 24 during the cutting of the section $m$ and $n$ in accordance with FIG. 1, may be varied as desired. The period during which the slide 15a is at a standstill is a gauge for the length of the sections $m$ and $n$ (FIG. 1) of the line 2. In the example of FIG. 14 the I-beam is moved in longitudinal direction at a constant speed.

According to FIG. 15 the electric motor 13' is mounted on the table top of the chassis 7, whereas the rack 11' is fixedly disposed on the floor of the shop. The severing device 14 in this example is arranged on a slide 27 adapted to be transversely displaced, which is guided in fixed uprights 28. The slide 27 is moved by the rocking lever 29 while a cam disc 31, the speed of which is synchronized with the advance speed of the carriage 7, determines the shape of the line 2 of FIG. 1. The pitch $t$ is here predetermined by one revolution of the cam disc 31, whereas the shape of the line 2 may be varied in any way by varying the cam profile.

The severing devices 14 according to the example of FIG. 16 are also mounted on a slide 27' adapted to be displaced in a transverse direction and guided in the uprights 28. At one end face of the slide 27' there is provided a feeler 35 which is guided in the guide slot 34 of the continuously rotating drum 33. Thus, while the I-beams 1 are moved in their longitudinal direction, a transverse movement of the slide 27' is automatically effected. The table 7', on which, for example, two I-beams are clamped, is designed as a rolling table which slides along the roller track 32, which is formed by numerous cylinders mounted in the bearings 28'. The longitudinal movement of the rolling table 7' is caused also in this example by the rack 11 which the pinion 12 of the fixedly mounted motor 13 engages.

The severing device in accordance with the example of FIG. 17 on the other hand is fixedly mounted in the bracket 36. Therefore in this example it is necessary for the I-beam 1 to carry out a longitudinal and also a transverse movement. For this purpose the clamping table 7, by means of the rollers 9, and 9'' travels in rolling engagement on several tables 37 supporting the juxtaposed guide rails 10 and 10' for the rollers 9 and 9''. The rails 10 and 10' connect all carriages 37 and thus it is necessary only for two drawing devices to be arranged, one behind the other, which in the example of FIG. 17 are in the shape of hydraulic or pneumatic cylinders 38 and associated pistons 39 in order to bring about the transverse movement of the carriage 37.

FIGS. 18 to 24 show some examples in which the severing device 14 is moved longitudinally as well as transversely relative to the fixedly clamped girder 1. The advantage of this apparatus resides in the fact that no spacious workshops are required for producing the honeycomb girder. If on the other hand the I-beam or girder is moved longitudinally then the workshops will have to be twice the length of the girders.

In accordance with the example of FIG. 18 a chassis 40 is provided with several wheels 41 which roll along the flanges of the girder 1. This chassis 40 is drawn by means of the hauling cable 40', which may also be a chain or any other traction element adapted to be wound up again, along the girder 1 at a constant speed. The rail 42 which has the separating device 14 thereon is mounted transversely displaceable in the chassis 40. Extending alongside the girder 1 there is a guide track 44 which is provided with a cam 45 in the shape of either a groove or a guide rail. By this guide track 44, 45 the rail 42 is caused to be guided in an oscillating manner by means of the guide pin 43 (if the guide track 45 is designed as a groove). The guide track 44, 45 may extend over the whole length of the girder 1. As shown by FIG. 18, however, it is also possible for the guide track to be composed of only two sections 44', 44'', the length of which amount to a multiple of the dimension of the pitch $t$ of the separating line 2. In the example of FIG. 18 the length of each section 44', 44'', is twice that of the pitch $t$ (compare FIG. 1). When the guide pin 43 has come to the end of section 44'', the latter is removed by the operator and placed in front of the particular section 44' in which the guide pin 45 has just arrived. Thus by means of repeated shifting of the sections 44', 44'' it is possible for girders 1 of any length to be bisected without necessitating the provision of a profiled template of a dimension equal to the length of the girder.

In accordance with FIG. 19 the longitudinal movement of the chassis 40 is caused by the pinion 12' which is in rolling engagement with the fixedly mounted rack 11'. One roller 41' thus centers the chassis 40, whereas the other roller 41 is cylindrical in shape and hence allows for different beams of varying depth of web to be converted within the same apparatus. The girder 1 is clamped to the base by means of the clamps 46. Mounted on the chassis 40 there are the bearing plates 48 in which the drum 49 is rotatably mounted. This drum 49 is driven by way of the chain wheels 51, 52 in dependence upon the advance speed of the chassis 40. Formed in the outer surface of the cylinder 49 there is a guide groove 50 in which slides the scanning pin 53 with which the severing device 14 is connected. This scanning pin 53 is guided transversely movable in a slot-like opening 47 of the chassis 40.

There are numerous modifications concerning this example. For example, it is possible for the chassis 40 to be mounted on rails provided alongside the I-beam. The severing tools may then be mounted on a laterally projecting slide. On the other hand it is possible for the severing tools 14 to be mounted on a bar travelling along on the girder 1, while at the end faces of the bar there are provided uprights which are mounted on the chassis.

It is also possible for a driving device to be provided which in the form of a drawing trolley draws along a further chassis which carries the control device for the transverse movement of the severing apparatus. The trolley may also have a motor which drives the friction wheels.

FIG. 20 shows a diagrammatic plan view of the apparatus in accordance with FIG. 19 wherein, however, in contradistinction to FIG. 19 it is assumed that the scanning pin 53′ is mounted on a lever 54 which at the point 55 is pivotally mounted. In this case the severing device 14 is located on the slide 57, which by way of the linking strap 56 is moved transversely to the longitudinal axis of the girder.

As shown also by FIG. 21 it is possible with the system of FIG. 20 despite the use of a fixed guide track 50, to vary the pattern of dividing line 2 by enabling the mounting of the drum 49 in the slot 58 of the side walls 48 to be shifted so that by altering the distance between the guide pin 53′ and the lever bearing 55, and the variation of the swinging angle caused thereby, there may be effected a change in the depth of the dividing line 2. For this reason there are provided the chain guide wheels 59, which despite the shifting of the drum 49 ensure that the chain wheel 51 engages satisfactorily. In order to allow the pitch $t$ of the dividing line 2 (compare FIG. 1) also to be varied it is advisable to incorporate in the transmission 51, 52 and 59 a stepped coupling or a stepless gear by means of which it is possible to realize the desired undulation periods $t$. As such transmissions are known they were omitted from the drawings in order to simplify FIGS. 20 and 21.

In place of the bearing displacement of the drum 49 it is also possible for the whole frame 48 to be shifted relative to the fixed bearing position 55 provided in the other frame 40.

In accordance with FIG. 22 several I-beams are adjacently disposed between auxiliary girders 60 fixed to the flanges. All the girders 1 and 60 are fixedly disposed on the base 65. On the mobile frame 40 there is disposed the motor 13′ which by way of the pinion 12′ and rack 11′ moves the frame 40. Mounted laterally displaceable in the frame 40 there is the slide member 57 which has the severing tools 14 mounted thereon. When using cutting torches 14, the gas cylinders 66 for the cutting device are attached to the frame 40. The lateral reciprocating movement is effected by the electric motor 62 which by way of the pinion 67 drives the rack 68 and thus is periodically switched forward and reverse. It is assumed that in the rack 11′ there is disposed a contact bar 68 along which the sliding contacts 69, 70 for the two motors 13′ and 62 slide. Thus it is possible for the motors to be remote-controlled and it is advisable in this case to use synchronous motors. While the motor 13′ is constantly driving, the motor 62 is regulated by means of an electric switching device which is successively stepped to forward, stop, reverse and again to stop. In addition it is also possible for the advance speed of the motor 13′ to be regulated in such a manner that during the cutting of the sections $m$ and $n$ (compare FIG. 1) the speed is reduced so that the severing tool 14 along the actual path travelled along the dividing line 2 has a constant speed.

By way of FIG. 23 it is shown that in a chassis 71 there is provided a hauling motor 13′, which on the one hand drives the chassis wheels 72 and on the other hand drives the drum 49. The drum 49 corresponds to that shown in FIG. 19. It is rotatably mounted in a further chassis 73 in which the slide member 57 together with the scanning pin 53′ mounted thereon is tranversely guided. Both chassis 71, 73 may be conducted along the girders 1 to be cut or on separate rails.

In place of guiding by way of a groove it is also possible in accordance with FIG. 24 to provide a rail guide. In FIGS. 24 and 25 the rail 74 is at the same time designed as a rack thus preventing the pinion 75 from slipping on the rail 74. The pinion 72 imparts the longitudinal movement to the frame 40 and the transverse movement to the slide member 57. The motor 76 is mounted on the slide member. For keeping the pinion 75 in any position in engagement with the rack 74 there is provided on slide 57 the compression spring 77 which urges the pinion constantly against the rack.

The slide member 78 in accordance with FIG. 26 is of double-armed construction with each arm supporting tools 79, for example, reaming tools. The upper tools may have a chip-removing function, whereas the lower tools 79, for example, are cutting-edge-like fixedly mounted counteracting tools. The frame 78 in turn is adapted to be moved at right angles to the direction of travel of the chassis 80. In order to prevent the arms of the frame 78 embracing the girders 1, 60 from colliding with the beam-supporting uprights 81, the uprights 81 are adapted to be individually raised or lowered. The table top 82 of each upright 81 immediately on arrival of the frame 78 in the proximity thereof is lowered beneath the lower frame arms, whereas all other uprights retain the girders 1, 60 in their upper position.

The band-saw device in accordance with FIG. 27 operates in the same manner; guide rollers 83 adapted to guide and brace the band saw blade 84 are mounted in the frame arms 78. Closely above and beneath the I-beam 1 there are rotatably mounted pairs of rollers 85 between which the saw blade 84 is passed. If the pairs of rollers 85 are twisted by means of the rods 86 it is possible to cut a relatively acute corner in the dividing line 2 at the transition point from the straight sections $m$ and $n$ to the oblique sections $s$ (compare FIG. 1).

In place of cutting torches 14 it is also possible to use chip-removing tools inserted in the transversely displaceable slide members, viz. particularly when separating non-ferrous girders, for example, of aluminum. Milling cutters, slotting or reaming tools, tenon saws or other unilaterally clamped tools which carry out only rotary movements or movements oscillating in the vertical plane are suitable for this purpose.

FIGS. 28 to 30 show how the individual I-beams 1 are held and stabilized after the separation thereof. It is immaterial in this case whether the girder is stationary or disposed on a mobile bogie. FIG. 28 shows that it is possible for any number of I-beams to be clamped adjacently in parallel arrangement, thus rendering it necessary to provide a like number of severing devices to enable all girder 1 to be bisected in one operation. Each of the girders 1 to be cut is clamped down either by means of an axiliary girder 60 or by means of clamping devices 62 adapted to be varied in length, i.e. pistons and piston cylinders, thus preventing the individual girder sections 1a, 1b (compare FIGS. 1 to 4) after being separated from tilting or even from becoming distorted. As soon as the I-beam has been divided the foremost girder section can be shifted longitudinally, by means of the auxiliary girder 60 connected therewith, by half a pitch, whereupon in the same apparatus the butts 2a, 2b are joined by spot welding (tacking), thus ensuring that the individual girder sections 1a, 1b will be firmly connected with one another when being moved. Then the girder sections are conveyed away for the final welding operation, hence allowing the next I-beams to be bisected. In accordance with the example of FIG. 28 the individual separated girder section 1a, 1b is never left unsupported.

FIG. 28 further shows that as clamping devices there are used hydraulically or pneumatically acting cylinders 62, the pistons of which are provided with flanges 63 to which short adapter strips 64 are connected. In these Z-shaped strips 64 there are clamped the girders 1 by means of clamps 65 and the T-handle 66.

The application of such clamping devices 62 is particularly evident from the example of FIGS. 29 and 30, in which it is shown that relative to the straight auxiliary girders 60 the separated sections of the girders 1 are deformed by means of the clamping devices 62, so that it is subsequently possible to produce, for example, curved girder shapes having a slight camber. Each of these clamping devices 62 may be individually controlled in the example of FIG. 24, thus allowing any desirable shape of girder sections to be obtained. The clamps 65 and 65' and also the flanges 63' of the clamping device 62 are in such case of convex design, thus causing the deformation of the girder sections not to affect the satisfactory clamping of these sections.

In FIG. 29 the I-beams or girders are assumed to have already been separated so that each girder section 1a, 1b is suspended to the clamping cylinder 62 associated therewith. Each cylinder 62 carries out an individual stroke by which first of all the girder sections B, C and F are drawn out of the fixedly held girder sections A, D and E to the extent of the depth of undulation of the dividing line 2 and then all girder sections A to F are bent in accordance with FIG. 30. Comparison of FIGS. 29 and 30 shows what stroke the clamping cylinders 62 have to execute in order to separate and also bend the girder sections in one operation. The clamping members 62 are then displaced through half a pitch $t$ between the girder sections B and C and also between the girder section F and the auxiliary girder 60 together with their mobile bases 87, whereupon the projections 2a, 2b (compare FIG. 3) are welded together. The camber created by means of the bending operation is shown grossly exaggerated in the drawing. In reality it is so slight that the error in pitch owing to the elongation is hardly noticeable. Thus in this case—contrary to FIG. 11—the girder sections 1a, 1b of the same I-beam may be joined together.

When the girder sections are firmly joined together by spot or tack welding they can be finally removed by crane to be welded. It is also possible to design the clamping cylinders 62 so that they can be raised or lowered, thus allowing the tacked and curved girders to be conveyed on roller conveyors. If the clamping cylinders 62 are lowered beneath the roller conveyors then the curved honeycomb shape of the girders is no obstruction.

The honeycomb girder shapes and the appartaus described for producing these shapes do not include all possible alternatives apparent to the expert in light of the present disclosure, hence the invention is not limited to the constructions shown.

What I claim is:

1. An apparatus for producing deeply webbed honeycomb girders by severing the web of an I-beam along an undulating line and recombining the resulting I-beam sections after transversely separating said sections and relatively displacing them in longitudinal direction for aligning projecting edge portions thereof with one another, comprising a first and a second group of holders arrayed in two parallel rows for releasable attachment of the holders of each group to a respective flange of an I-beam positioned between said groups, and means movably supporting at least one of said groups of holders enabling relative displacement of said groups in both transverse and longitudinal direction of said I-beam, the holders of at least one of said groups including a set of pistons extending transversely to said flanges, said supporting means including cylinders respectively receiving said pistons and a common base for said cylinders.

2. An apparatus according to claim 1 wherein said cylinders are provided with fluid-supply means concurrently operable to displace said pistons over different distances, thereby imparting a camber to the flange engaged by said pistons upon the severance of the web of said I-beam.

3. An apparatus for producing deeply webbed honeycomb girders by severing the web of an I-beam along an undulating line and recombining the resulting I-beam sections after transversely separating said sections and relatively displacing them in longtiudinal direction for aligning projecting edge portions thereof with one another, comprising first holder means positionable between two parallel I-beams to be severed and releasable securable to the adjoining flanges of both of said I-beams, second and third holder means respectively positioned adjacent the remaining flanges of said I-beams and releasable securable thereto, and means movably supporting certain of said holders enabling relative displacement thereof in both transverse and longitudinal direction of said I-beams, said supporting means including a piston cylinder between said I-beams, said first holder means comprising a pair of pistons projecting from opposite ends of said cylinder into engagement with said adjacent flanges, said cylinder being provided with fluid-supply means for concurrently moving said pistons inwardly upon the severance of the webs of said I-beams, thereby separating the resulting inner I-beam sections from the outer ones.

References Cited in the file of this patent

UNITED STATES PATENTS

| | | |
|---|---|---|
| 740,730 | Zeh | Oct. 6, 1903 |
| 1,623,249 | Kahn | Apr. 5, 1927 |
| 1,644,940 | Moyer | Oct. 11, 1927 |
| 2,002,044 | Rothenstein | May 21, 1935 |
| 2,106,602 | Hunter | Jan. 25, 1938 |
| 2,277,615 | Townsend | Mar. 24, 1942 |